E. M. COLE.
STALK CUTTER.
APPLICATION FILED FEB. 14, 1912.
1,074,930.
Patented Oct. 7, 1913.
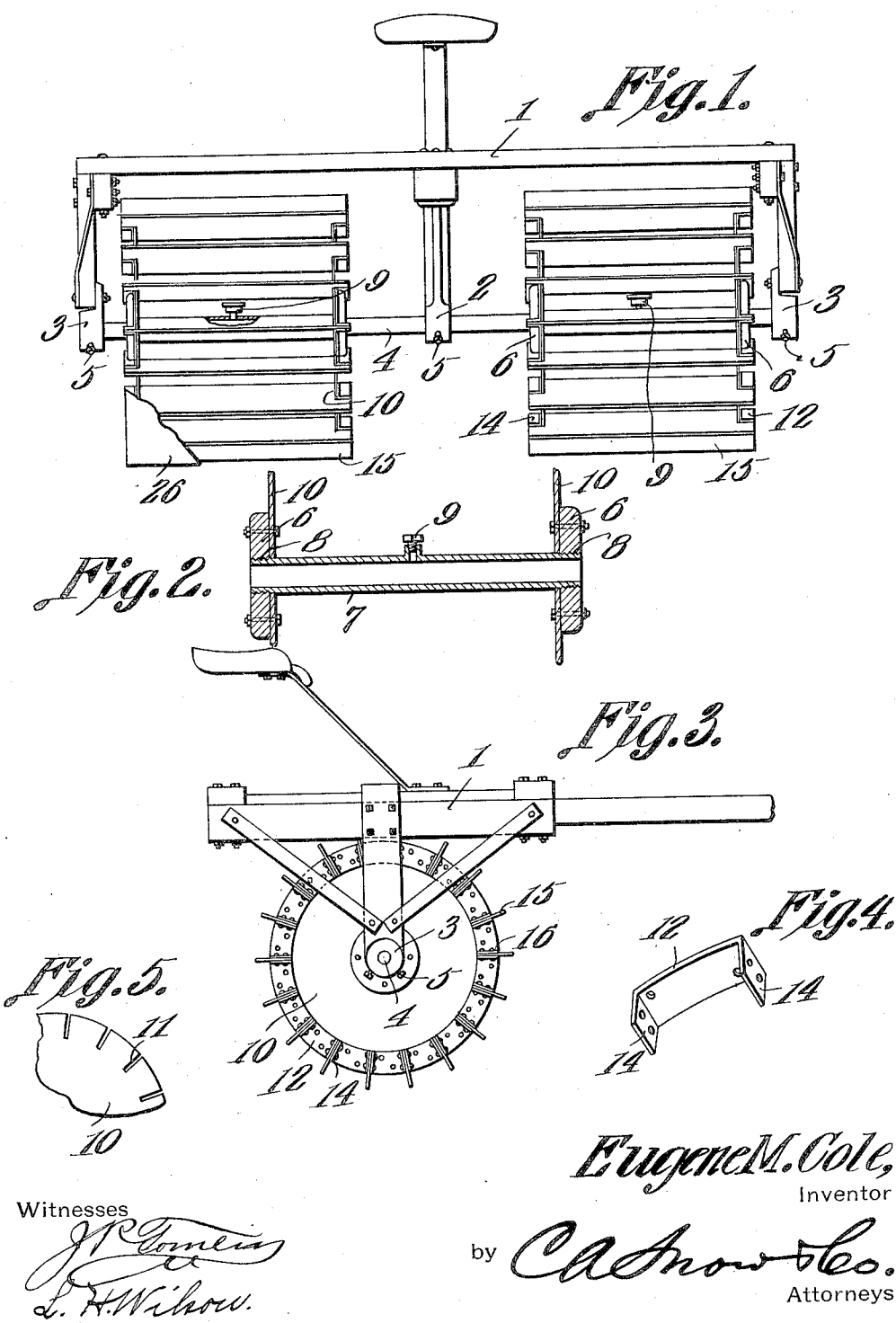
Eugene M. Cole,
Inventor
by C. A. Snow & Co.
Attorneys
Witnesses

UNITED STATES PATENT OFFICE.

EUGENE MACON COLE, OF CHARLOTTE, NORTH CAROLINA.

STALK-CUTTER.

1,074,930.

Specification of Letters Patent.

Patented Oct. 7, 1913.

Application filed February 14, 1912. Serial No. 677,421.

*To all whom it may concern:*

Be it known that I, EUGENE MACON COLE, a citizen of the United States, residing at Charlotte, in the county of Mecklenburg and State of North Carolina, have invented a new and useful Stalk-Cutter, of which the following is a specification.

One object of the invention is to provide a novel form of knife cylinder adapted for use in a stalk cutter.

A further object of the invention is to provide an improved bearing for the stalk cutters and other agricultural implements.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in rear elevation, Fig. 2 is a fragmental transverse section of one of the knife cylinders; Fig. 3 is a side elevation of the structure shown in Fig. 1; Fig. 4 is a perspective of one of the brackets which are employed for connecting the knives with the ends of the knife cylinders; and Fig. 5 is a fragmental elevation of one of the heads of the knife cylinders.

In carrying out the invention there is provided, as a primary and fundamental element, a supporting frame 1. This frame 1 may be made in a wide variety of forms, and since its general outline and functions, are well known, a detailed description of the frame is not necessary. The frame 1, however, is provided with a central bearing 2, when desired, and with side bearings 3, in which bearings, the axle 4 is mounted, the axle being held in place by set screws 5, entering the bearings, or in any other desired manner.

There may be any number of knife cylinders. In the present instance, two of these cylinders are shown, but since they are duplicates, a description of one of them will suffice for the description of the other.

In fashioning the knife cylinders, hubs 6 are provided, into which are threaded, as shown at 8, the ends of a pipe 7. Intermediate the ends of the pipe 7, the same is provided with an oil cup 9. The heads of the knife cylinder, consist of plates 10, secured to the hubs 6 by bolting, or in any other desired manner. The plates 10, adjacent their peripheries, are provided with slots 11, and between the slots 11 are disposed brackets 12, having angularly disposed arms 14, projecting inwardly into the knife cylinder, the brackets 12 being secured to the plates 10, by bolting, or in any other desired manner. The blades are denoted by the numeral 15. These blades 15 fit into the slots 11, between the arms 14 of adjacent brackets 12, and through the arms 14 of adjacent brackets 12, and through the blades 15, bolts 16, or other securing elements adapted to a like end, are passed.

When it is desired to employ the stalk cutter as a land roller, the knife cylinders are surrounded by a separable casing.

It is to be noted that the knives are relatively near together, circumferentially of the knife cylinders, and owing to this construction, the knives cylinders may be employed for supporting and transporting the device, in place of the wheels, as is commonly the custom. Owing to the fact that the knives are near together, an excessive jolting is avoided, and, moreover, the stalks are cut up into shorter pieces.

The knife cylinder may be manufactured at no great expense, and an efficient and durable knife cylinder construction is presented.

The bearing hereinbefore described is of relatively great length, thus reducing wear, and the introduction of the oil through the oil cup 9, intermediate the ends of the pipe 7, serves to clean the bearing, as the lubricant works outwardly, toward the ends of the knife cylinders. When the casing 26 shown in Fig. 1 is applied about the knife cylinders, the stalk cutter may be employed as a land roller, it being unnecessary to employ jacks or other lifting means, in order to apply the casing about the knife cylinders.

Having thus described the invention what is claimed is:—

1. A stalk cutter comprising a frame; bearings carried by the frame; a shaft mounted in the bearings; a tube journaled for rotation on the shaft, hubs secured to the tube; plates surrounding the tube and abutting against the hubs; means for connecting the plates with the hubs; and blades connecting the plates and coöperating with the tube to hold the plates and the hubs in spaced relation.

2. In a device of the class described, a rotatable member comprising spaced heads having peripheral notches; cutting blades resting in the notches; brackets secured to the heads between the notches and having inwardly projecting arms, the terminal arms of adjacent brackets being supported upon opposite sides of a blade; and securing elements engaging said arms and said blade.

In testimony that I claim the foregoing as my own, I have hereto affixed my signature in the presence of two witnesses.

EUGENE MACON COLE.

Witnesses:
J. A. WILLIAMS,
H. F. WOLFE.

---

Copies of this patent may be obtained for five cents each, by addressing the "Commissioner of Patents, Washington, D. C."